United States Patent

[11] 3,599,999

[72] Inventors Albrecht Schnizler
Nurtingen-Wurttemberg;
Hermann Kieser, Nurtingen-Oberensingen,
both of, Germany
[21] Appl. No. 878,652
[22] Filed Nov. 21, 1969
[45] Patented Aug. 17, 1971
[73] Assignee Metabowerke KG Closs, Rauch & Schnizler
Nurtingen/Wurttemberg, Germany
[32] Priority Nov. 23, 1968
[33] Germany
[31] P 18 10 614.4

[54] CHUCK
10 Claims, 1 Drawing Fig.
[52] U.S. Cl. ................................................ 279/60,
77/60, 90/11 A, 279/1 R
[51] Int. Cl. ...................................................... B23b 31/12
[50] Field of Search .............................................. 90/11 A;
269/22, 23; 279/1, 1 D, 1 ME, 1 Q, 60, 65; 77/60,
55.3

[56] References Cited
UNITED STATES PATENTS
2,961,529 11/1960 Young ......................... 269/23 X
3,237,955 3/1966 McCarthy et al. ............ 77/60 X
FOREIGN PATENTS
853,849 1952 Germany ..................... 279/1 ME Primary Examiner—Andrew R. Juhasz
Assistant Examiner—James F. Coan
Attorney—Michael S. Striker ABSTRACT: A tubular outer body has an open end and an inner body is threadedly received in the outer body for movement in opposite directions towards and away from the open end. A plurality of jaws are provided in the outer body adjacent the open end and movable between a tool-engaging and a tool-releasing position in response to movement of the inner body in the respective opposite directions. Elastic sealing means in the outer body intermediate the inner body and the jaws protects the inner body against entry of contaminants.

PATENTED AUG 17 1971
3,599,999
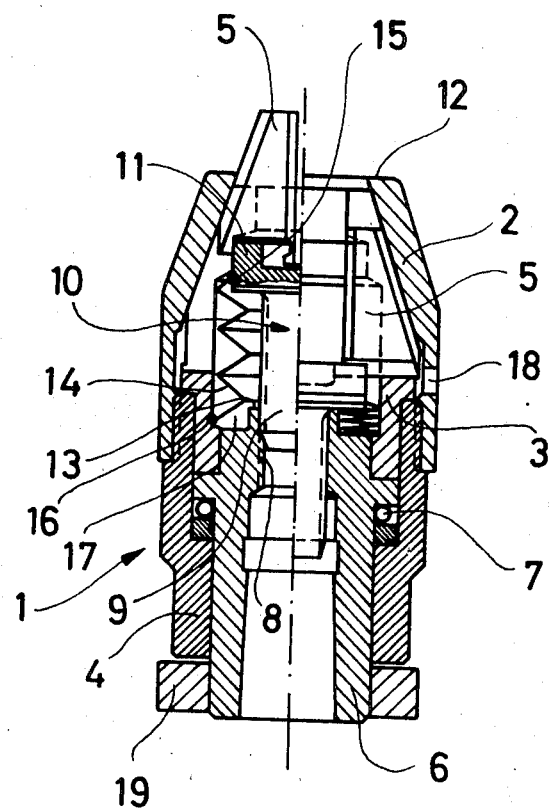
INVENTORS
ALBRECHT SCHNIZLER
HERMANN KIESER
BY Michael J. Striker
ATTORNEY

CHUCK

BACKGROUND OF THE INVENTION

The present invention relates generally to a chuck, and more particularly to a chuck comprising an outer body, and inner body threadedly movable within the outer body, and jaws for engaging a tool and disengaging it, in response to movement of the inner body with reference to the outer body in one or another direction.

Chucks of this type are already known, and in fact many different constructions of such chucks are commercially available. In general application these devices have been found satisfactory. However, there are certain applications where they are found to be possessed of disadvantages which make it desirable to provide improvements. Specifically, in certain circumstances such as the drilling of concrete, masonry or the like, the chuck is subject to very significant contamination by particles of the material into which a hole is made with the tool which is gripped by the chuck. This has two disadvantageous results, namely on the one hand the intrusion of such contaminants into the interior of the chuck makes the operation of the chuck itself—that is movement of the chuck between tool-engaging and tool-releasing positions of the jaws—much more difficult than is desirable and necessary, while on the other hand the entering dustlike or generally particulate contaminants combine with the lubricants for the movable parts of the chuck to form a paste which is highly abrasive and therefore greatly reduces the usable life of the chuck. This is particularly true of keyless chucks which are opened and closed manually and without the benefit of a key.

SUMMARY OF THE INVENTION

It is, accordingly, a general object of the present invention to provide an improved chuck.

More particularly it is an object of the present invention to provide a chuck which is protected against entry of contaminants.

A further object of the invention is to provide such a chuck which because of its protection against the entry of contaminants into the interior is easy to operate at all times and has a considerably improved life expectancy.

In pursuance of the above objects, and others which will become apparent hereafter, the novel chuck according to the present invention comprises a tubular outer body having an open end, and an inner body which is threadedly received in the outer body for movement in opposite directions towards and away from the open end. A plurality of jaws is provided in the outer body adjacent the open end and is movable between an tool-engaging and a tool-releasing position in response to movement of the inner body in the respective opposite directions. Elastic sealing means is provided in accordance with the invention which is located in the outer body intermediate the inner body and the jaws and which protects the inner body against entry of contaminants from the open end of the outer body.

This provides for sealing of the movable parts of the chuck with respect to the stationary parts and thereby prevents the entry of contaminants. It is particularly advantageous to construct the sealing means as a bellows-shaped member of elastically deflectable material whose one end is connected to the inner body and whose other end is connected to the outer body in the region of the jaws. The bellows member may consist of various different materials, including elastomeric materials such as rubber and synthetic plastics.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE is a longitudinal section through a chuck embodying the present invention, showing the chuck in one position in the left-hand side and in another position at the right-hand side.

DESCRIPTION OF THE PREFERRED EMBODIMENTS

It is firstly emphasized that at the left-hand side of the drawing the chuck according to the present invention is shown in a position where the jaws are extended outwardly through the open end of the chuck to engage tools of small diameter, whereas at the right-hand side they are shown withdrawn to release the tools or to engage tools of larger diameter. Both sides of the drawing show one and the same embodiment, however. Discussing the drawing now in detail it will be seen that reference numeral 1 generally identifies the chuck according to the present invention. This chuck comprises a conically tapering annular member 2 which, together with an annular guide member 3 and a supporting member 4, constitutes an outer body having an open end indicated by reference numeral 12. The members 2 and 4 are screw-threadedly connected and thus maintain the guide member 3 in place.

Located within the outer body, and guided within the guide member 3, are conventional tool-engaging jaws 5 which abut against the conically tapering inner circumferential surface of the member 2, as shown in at the left-hand side of the drawing. Thus, when these jaws 5 move outwardly through the open end 12, they are in abutment with the inner circumferential surface of the member 2 and are thus urged inwardly towards one another in response to continued movement outwardly of the open end 12. When they are withdrawn, as shown at the right-hand side of the drawing, they are slightly inwardly spaced from the circumferential surface of the member 2.

An inner turnable body 6 is located within the supporting body 4, and a bearing 7 absorbs axially thrusts. The inner body 6 is provided with internal screw threads 8 which mesh with corresponding threads on the shaft 9 of a member 10 provided with a head portion 11 which is connected with the jaws 5 so that, when the member 10 advances forwardly in direction towards the open end 12, it urges the jaws 5 outwardly through the open end 12 so that they move inwardly towards one another guided by the inner circumferential surface of the member 2. Conversely, rearward movement of the member 10 causes the jaws 5 to be inwardly withdrawn to the position shown at the right-hand side of the drawing.

In pursuance of the objects of the present invention the interior of the chuck, and specifically the elements which are susceptible to damage by entry of contaminants through the open side 12, is protected against such contaminants by the provision of elastic sealing means 14 which advantageously is in form of a bellows-shaped member 14. This is located between the head portion 11 and the guide member 3 approximately at the level of the end face 13 of the turnable body 6. Grooves 15 and 16 are provided extending circumferentially, and these grooves each accept sealingly a circumferential bead provided at the opposite ends of the bellows-shaped sealing body 14.

In the axial end face 13 there is provided an annular recess 17 into which the bellows-shaped sealing body 14 is withdrawn (compare the right-hand side of the drawing) when the chuck is opened to tool-releasing position or to a position in which it engages large-diameter tools.

Advantageously the member 2 is provided with one or a plurality of apertures 18 through which contaminants entering the open end 12 may escape outwardly by passing between the sealing body 14 and the inner side of the member 2.

A knurled or otherwise configurated turnable portion 19 is rigid with the inner body 6 so that, if the portion 19 is for instance turned in counterclockwise direction, the inner body 6 is turned in the same sense, it being understood that the outer body composed of the elements 2, 3 and 4 is maintained stationary at such time. This causes the member 10 with its head 11 and thereby the jaws 5 to move inwardly from the position shown at the left-hand side of the drawing to the position shown at the right-hand side of the drawing, so that the jaws move radially apart from one another until they finally assume the end position shown at the right-hand side of the drawing. As this takes place, the bellows-shaped sealing member 14 is axially contracted from the expanded position shown at the left-hand side of the drawing to the contracted position shown at the right-hand side of the drawing in which it is lodged in the recess 17. It will be appreciated that regardless of the relative positions of the movable elements with reference to one another, the interior of the chuck will always be protected against the entry of contaminants.

In this manner the chuck is reliably operative at all times, under all circumstances and in all applications, while its life expectancy is drastically increased. Furthermore, the chuck can be easily used, that is it can be easily turned because contaminants can no longer adversely influence the ease of operation. At the same time it will be appreciated that the construction of the chuck is simple and therefore relatively inexpensive, and that despite the provision of the sealing means the external dimensions of the chuck need not be increased over those necessary without the provision of the sealing means. This is particularly the result of the provision of the recess 17. Of course, it will also be appreciated that the illustrated embodiment is purely exemplary and that within the scope of the present invention modifications are entirely possible.

It will be understood that each of the elements described above, or two or more together, may also find a useful application in other types of constructions differing from the types described above.

While the invention has been illustrated and described as embodied in a chuck, it is not intended to be limited to the details shown, since various modifications and structural changes may be made without departing in any way from the spirit of the present invention.

Without further analysis, the foregoing will so fully reveal the gist of the present invention that others can by applying current knowledge readily adopt it for various applications which, from the standpoint of prior art, fairly constitute essential characteristics of the generic or specific aspects of this invention.

What We claim as new and desire to be protected by Letters Patent is set forth in the appended claims:

1. A chuck, comprising a tubular outer body having an open end; an inner body threadedly received in said outer body for movement in opposite directions towards and away from said open end; a plurality of jaws in said outer body adjacent said open end and movable between a tool-engaging and a tool-releasing position in response to movement of said inner body in the respective opposite directions; and elastic sealing means in said outer body intermediate said inner body and said jaws and protecting the former against entry of contaminants from said open end.

2. A chuck as defined in claim 1, said elastic sealing means comprising an elastically compressible member.

3. A chuck as defined in claim 2, wherein said elastically deformable member is bellows shaped and has opposite axial end portions one of which is sealingly connected to an inner circumferential surface of said outer body adjacent said jaws and the other of which is sealingly connected to said inner body.

4. A chuck as defined in claim 3, said inner circumferential surface and said inner body having respective grooves, and said axial end portions each being sealingly received in one of said grooves.

5. A chuck as defined in claim 1, said outer body having a tubular first portion, a tubular second portion projecting axially from said first portion and having an inner circumferential face tapering conically away from said first portion and toward said open end, and an annular guide portion located within the confines of said first and second portions and guiding said jaws for movement between said positions thereof; and an engaging portion operatively connected with said inner body and rotatable about the longitudinal axis of said outer body for thereby effecting said movement of said inner body.

6. A chuck as defined in claim 5, said elastic sealing means comprising an elastically deformable member having two axial ends one of which is sealingly connected with said guide portion proximal to said inner body.

7. A chuck as defined in claim 2, said inner body having an end face directed towards said open end; and further comprising a recess provided in said end face and so DIMENSIONED as to accommodate therein said elastic member in elastically compressed condition when said jaws are in said tool-releasing position thereof.

8. A chuck as defined in claim 1, said inner tubular body including a tubular body portion spaced from said open end and a projecting body portion projecting axially from said tubular body portion towards said open end and provided with an engaging head engaging and associated with said jaws for effecting movement of the same between said positions, said head having an outer circumferential surface; and wherein said elastic sealing means comprises a tubular elastically compressible body surrounding said projecting body portion and having one end sealingly engaging said outer circumferential surface of said bead.

9. A chuck as defined in claim 5, said annular guide portion being provided with a plurality of apertures communicating with the ambient atmosphere for escape of entrapped contaminants to the latter.

10. A chuck as defined in claim 2, wherein said elastically compressible member consists at least in part of elastomeric material.